(No Model.) 2 Sheets—Sheet 1.
W. H. TASKER & T. J. JONES.
GALVANIC BATTERY.
No. 358,087. Patented Feb. 22, 1887.
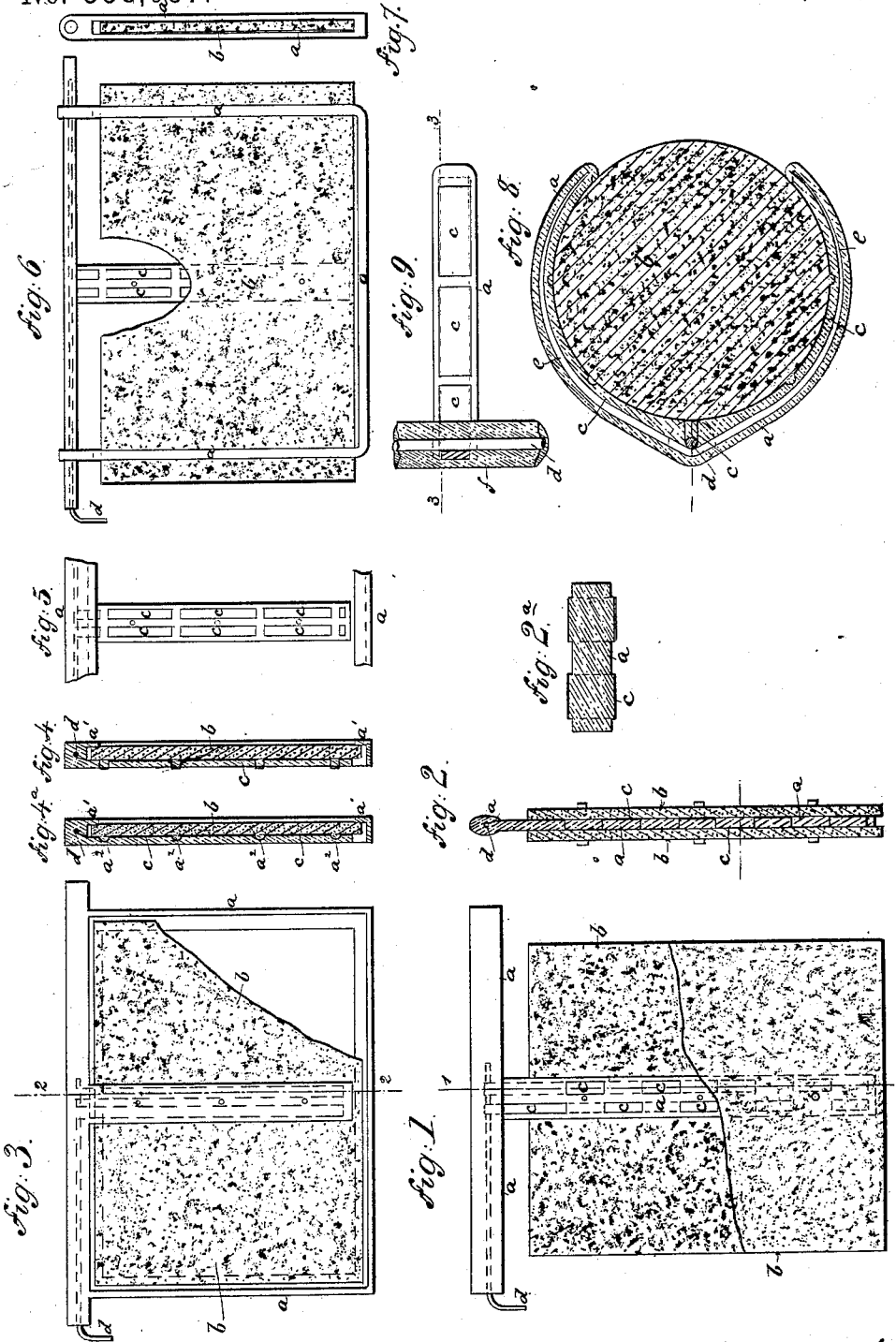
Witnesses:
A. Schiehl
Hampus Ink
Inventors:
Wm H. Tasker
Thos J. Jones
by Briesen & Steele
Attorneys.

(No Model.) 2 Sheets—Sheet 2.
W. H. TASKER & T. J. JONES.
GALVANIC BATTERY.
No. 358,087. Patented Feb. 22, 1887.
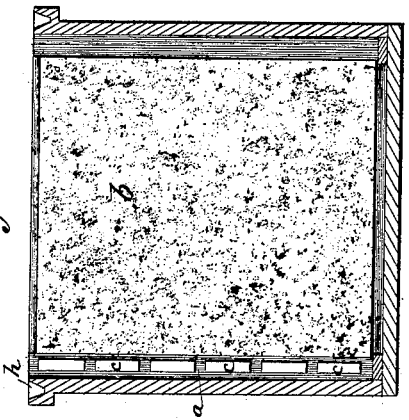
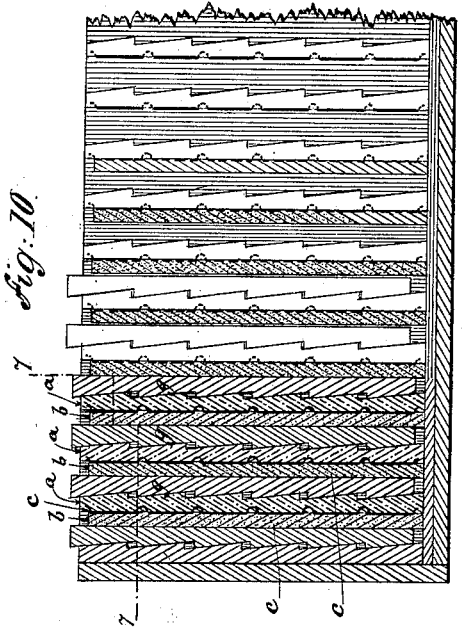
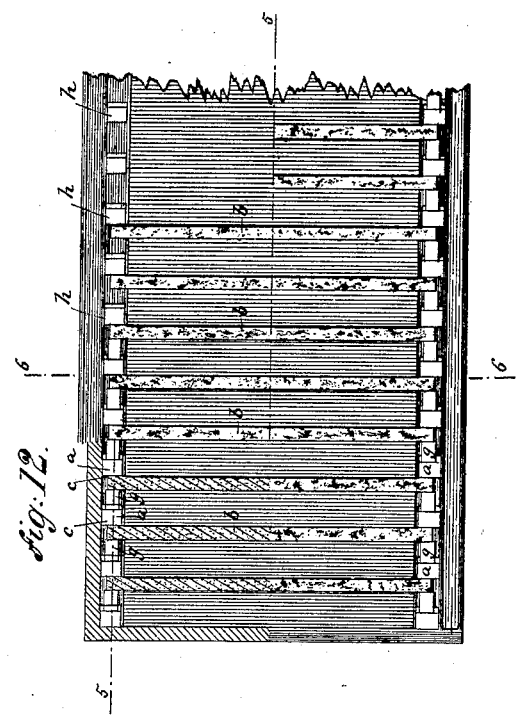

United States Patent Office.

WILLIAM HOWARD TASKER AND THOMAS JOHN JONES, OF LONDON, ASSIGNORS TO THE PRIMARY BATTERY COMPANY, (LIMITED,) OF HANOVER SQUARE, COUNTY OF MIDDLESEX, ENGLAND.

GALVANIC BATTERY.

SPECIFICATION forming part of Letters Patent No. 358,087, dated February 22, 1887.

Application filed April 22, 1886. Serial No. 199,870. (No model.) Patented in England July 16, 1885, No. 8,627, and in France October 16, 1885, No 171,706.

*To all whom it may concern:*

Be it known that we, WILLIAM HOWARD TASKER, of 18 Upper Woburn Place, Tavistock Square, London, England, electrician, and THOMAS JOHN JONES, of 12 Princes street, Hanover Square, London, England, electrician, have invented new and useful Improvements in Galvanic Batteries and in the Electrodes of Electrolytic Converting Tanks or Troughs, of which the following is a full, clear, and exact description, and for which I have obtained Letters Patent in England, dated July 16, 1885, No. 8,627, and Letters Patent in France, dated October 16, 1885, No. 171,706.

Our invention relates to elements for galvanic batteries, (particularly the negative elements of lead primary batteries;) and it has for its object to construct a support for the active material which shall not be liable to become disintegrated by the effect of electrolysis, and which is provided with means of making good conductive connection with the active material.

The invention may also be applied to the elements of secondary batteries and to the supports of the electrodes of tanks or troughs used for the electrolytic conversion of lead and its compounds.

The support is constructed of gutta percha, india-rubber, celluloid, xylonite or equivalent non-conducting and inoxidizable (or nearly inoxidizable) substance, to which strips or flattened wires or ribbons of conductive and inoxidizable material (preferably gold or platinum foil or leaf) are applied in such manner as to be retained securely in place and at the same time make efficient contact with the active material. It has before been proposed to employ the same materials for the same purpose, the foil being caused to adhere to the non-conducting substance by means of a solvent heat and pressure, and the object of this invention is to accomplish the same end by the mere mechanical construction and arrangement of the support and the conductor.

The method of securing the conductor to the support consists, essentially, in lacing or passing the conductive strips, wires, or ribbons, either wholly or partially, through the support, so as to secure the strips, &c., to the support at intervals, the intervening portions of the strips, &c., lying alternately upon the two faces or wholly upon the one face of the support, according as it is desired to make contact with the active material or element on both sides or on one side only of the support.

Reference is to be had to the accompanying drawings, forming part of this specification, wherein Figure 1 is a face view of an element, part of the active material being broken away; and Fig. 2 a vertical section of the same on line 1 1, Fig. 1. Fig. 2ᵃ shows a detail. In these figures the foil is laced through slits in the support to and fro from side to side, the active material being in contact with the conductor at both sides of the support. Fig. 3 is a face view of another element, (the active material being partly broken away;) and Fig. 4 is a cross-section of the same on line 2 2, Fig. 3. Fig. 4ᵃ is a modification. Fig. 5 is a face view of the center portion of the support, showing the arrangement of the foil at the opposite side to that shown in Fig. 3. Fig. 6 is a face view, and Fig. 7 a vertical section of another element, (the active material being partly broken away,) the support being of slightly different construction to the preceding one. Fig. 8 is a section on line 3 3, Fig. 9, which is a section on line 4 4, Fig. 8, (the active material being omitted,) of a spring conducting and supporting clip for a cylindrical mass of active material. In Figs. 3 to 9 the active material is in contact with the conductive strips, &c., at one side only of the support, and the said strips need not therefore pass entirely through the insulating support. Fig. 10 is a vertical longitudinal section (on line 5 5, Fig. 12) of a battery in which plates of active material are wedged in contact with conductors constructed in the manner shown in Figs. 3 to 9. Fig. 11 is a cross-section, (on line 6 6, Fig. 12,) and Fig. 12 is a plan, (partly in section on line 7 7, Fig. 10,) of the same battery.

In Figs. 1 and 2 *a* is a T-shaped support of insulating material, the central bar of which is clamped (by means of screw-bolts made of inoxidizable material) between two slabs or plates of active material, *b*, (or embedded in a plate or mass of active material,) making contact on both sides with strips, &c., $c$ of platinum or gold foil threaded or laced through slits made through the support $a$ from face to face, the strips taking a zigzag direction, as shown in Fig. 2. There are preferably two such strips arranged side by side and alternating with one another, as shown in Fig. 1, so that the portions of the one strip which extend along the one face of the central support are opposite the spaces on the same side left uncovered by the other strip, and vice versa. The insulating-support is made as thin as is consistent with strength, so as to cover or embed as little of the conducting-foil as possible. Both strips of foil are in electrical connection with a conductor, $d$, of copper or other wire, embedded in the head of the T-support, and having a downwardly-turned end for immersion in a mercury-trough alongside the cell, on the sides of which the ends of the T-head rest to support the element in position in the cell. In order to insure that the foil shall make good contact with the active material, the support is preferably, in all cases, made of such section (as shown in cross section in Fig. $2^a$) that the active material will press mainly against the strip and not against the support.

In Figs. 3 to 5 the support is in the form of a rabbeted rectangular frame, $a$, and the plate $b$ of active material is held between the rabbet $a'$ of the frame $a$ and a central cross-bar pressing against the opposite face of the plate $b$. This central bar (which is in one piece with the top bar of the frame) is in contact with one side only of the active material, and the strips $c$ of gold or platinum foil consequently lie principally on that side on which contact is made.

As shown in Fig. 5, the strips $c$ may either be threaded (as described with reference to Figs. 1 and 2) through slits in the insulating material, as shown in Fig. 4, or they may only be carried partially through the insulating material, as shown in Fig. $4^a$. In the latter case the insulating-support is molded or otherwise formed with the cavities, in which the strips are imprisoned by bridge-pieces $a^2$ of insulating material, united to the main body of the support. The strips $c$ are connected to a conductor, $d$, embedded in the top bar of the supporting-frame, like that before described.

In Figs 6 and 7 the plate of active material $b$ is held in slots in the end bars of the supporting-frame $a$, the contact strips of gold or platinum being supported and applied in either of the ways last described.

Figs. 8 and 9 represent a spring conducting and supporting clip, of which there may be any number, in connection with the same main stem. It consists of a steel spring, $e$, embedded in insulating material, $a$, and branching from a stem, $f$, of insulating material, in which is embedded a main conductor, $d$. $c$ is a strip of gold or platinum foil, with which the inner surface of the spring-arms of the clip are faced, the foil being in electrical contact with the conductor $d$, and being held in position against the insulating material by passing partially through it at intervals, in the manner above described.

In Figs. 10, 11, and 12 the supports $a$ for the plates $b$, of active material, are ribs attached by a solvent heat and pressure to the sides of the cell, which is also made of insulating material. The ribs at one side of the cell have strips $c$ of gold or platinum foil applied down one side face, in the manner above described. Against these ribs plates of active material are pressed by wedges $g$, of insulating material, driven in between the opposite face of the plates $b$ and the other face of the adjacent rib, $a$, the meeting faces of the wedges and ribs being inclined to correspond to each other, as shown. Each plate thus makes good contact along one of its vertical sides with a conducting strip of foil, and each of these strips is connected at the upper end to a tang, $h$, of copper wire, which is bent over the edge of the cell and dips in a trough of mercury alongside the cell.

In the battery represented in Figs. 10, 11, and 12 all the plates shown are negative elements, and it is intended that the positive plates should be merely suspended between the negative plates and be placed in connection by any suitable means with a mercury-trough at the opposite side of the cell.

The various forms of elements and their supports, represented in the drawings, are given merely by way of example; and our invention applies to all forms of supports or contacts wherein platinum or gold foil, wires, or ribbon is to be applied to an inoxidizable material. These supports must not be used in a battery or converting-tank in which a chlorine compound is present in the active material or the electrolyte.

Having now particularly described and ascertained the nature of the said invention, and in what manner the same is to be performed, we declare that what we claim is—

In a galvanic battery, the combination of the insulating supporting-frame $a$, with the conductive strips $c$, of platinum or gold foil or leaf, which are laced through said frame $a$, conducting-plate $b$, which is held in contact with the strips $c$, and conductor $d$, which is embedded in the support $a$ and extends therefrom for contact purposes, substantially as herein specified and represented in the drawings.

The above specification of our invention signed by us this 31st day of March, 1886, and this 9th day of April, 1886, respectively.

WILLIAM HOWARD TASKER.
THOMAS JOHN JONES.

Witnesses:
G. F. WARREN,
   *Notary Public, London.*
W. JAS. SKERTEN,
   *17 Gracechurch Street, London, E. C.*